United States Patent [19]
Hellman, Jr.

[11] Patent Number: 5,927,838
[45] Date of Patent: Jul. 27, 1999

[54] CABINET HAVING SIMPLIFIED PANEL CONSTRUCTION

[75] Inventor: Robert R. Hellman, Jr., Oxford, Conn.

[73] Assignee: The Durham Manufacturing Company

[21] Appl. No.: 08/955,678

[22] Filed: Nov. 6, 1997

Related U.S. Application Data

[62] Division of application No. 08/852,314, May 7, 1997.

[51] Int. Cl.⁶ ................................................ A47B 43/00
[52] U.S. Cl. ..................................... 312/257.1; 312/263
[58] Field of Search ............................. 312/257.1, 263, 312/265.5, 265.6, 400, 406, 406.2

[56] References Cited

U.S. PATENT DOCUMENTS

| | | | |
|---|---|---|---|
| 4,848,859 | 7/1989 | Edmonds et al. | 312/257.1 |
| 4,958,890 | 9/1990 | Anderson et al. | 312/406.2 |
| 5,002,191 | 3/1991 | Herbst | 312/257.1 X |
| 5,375,921 | 12/1994 | Tupa et al. | 312/257.1 |
| 5,378,057 | 1/1995 | Bach et al. | 312/257.1 |
| 5,645,332 | 7/1997 | Snoke et al. | 312/257.1 |

*Primary Examiner*—Peter M. Cuomo
*Assistant Examiner*—James O. Hansen
*Attorney, Agent, or Firm*—John H. Crozier

[57] ABSTRACT

A cabinet, including: a generally hollow, rectilinear housing having opposite sides and top, back, and bottom walls; the side panels having rearwardly facing U-shaped channels formed along front edges thereof; and inner side panels attachable to the side panels by insertion of front edges thereof into the U-shaped channels and rotating the inner panels about the U-shaped channels to parallel proximity with inner surfaces of the side panels and being removably secured in such position.

10 Claims, 8 Drawing Sheets

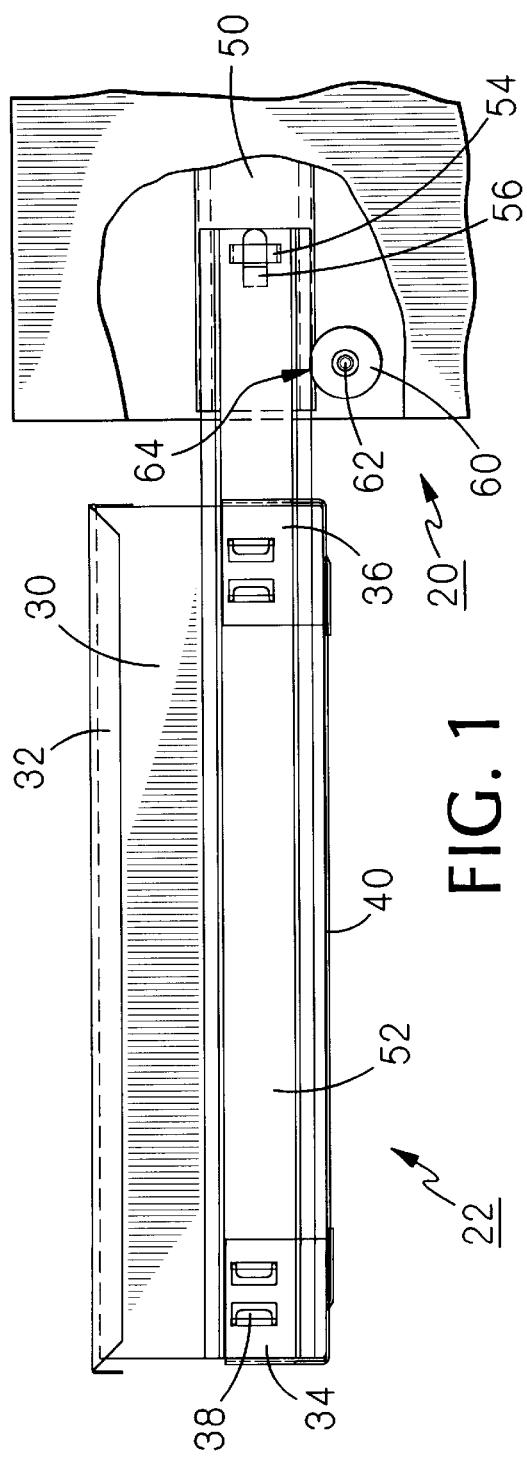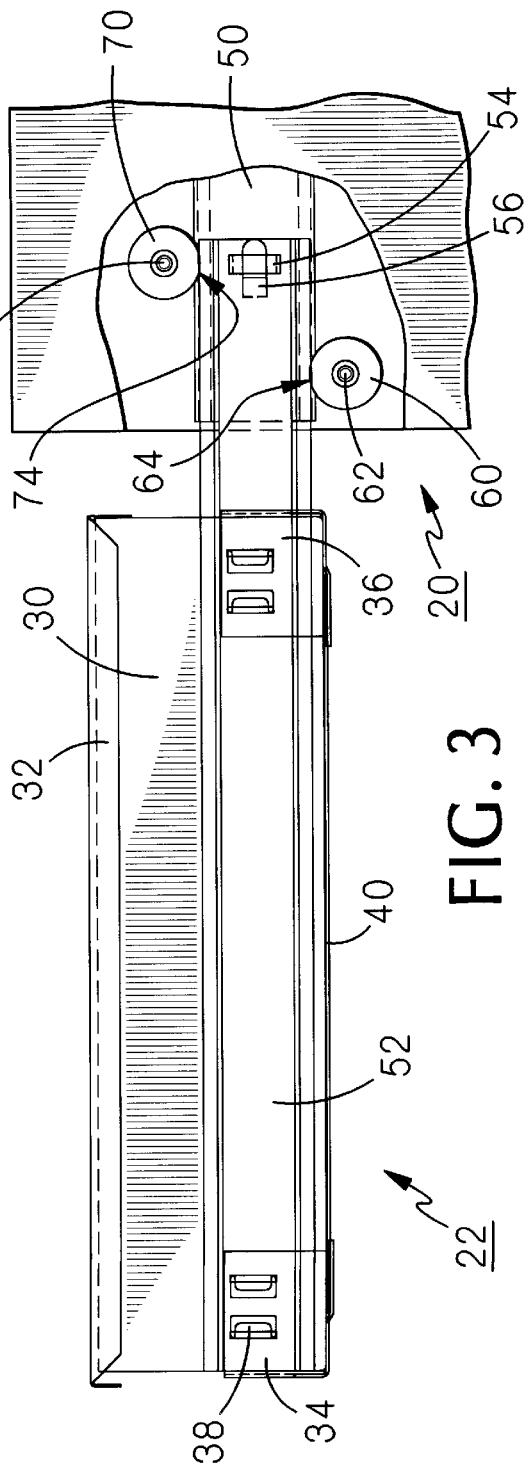

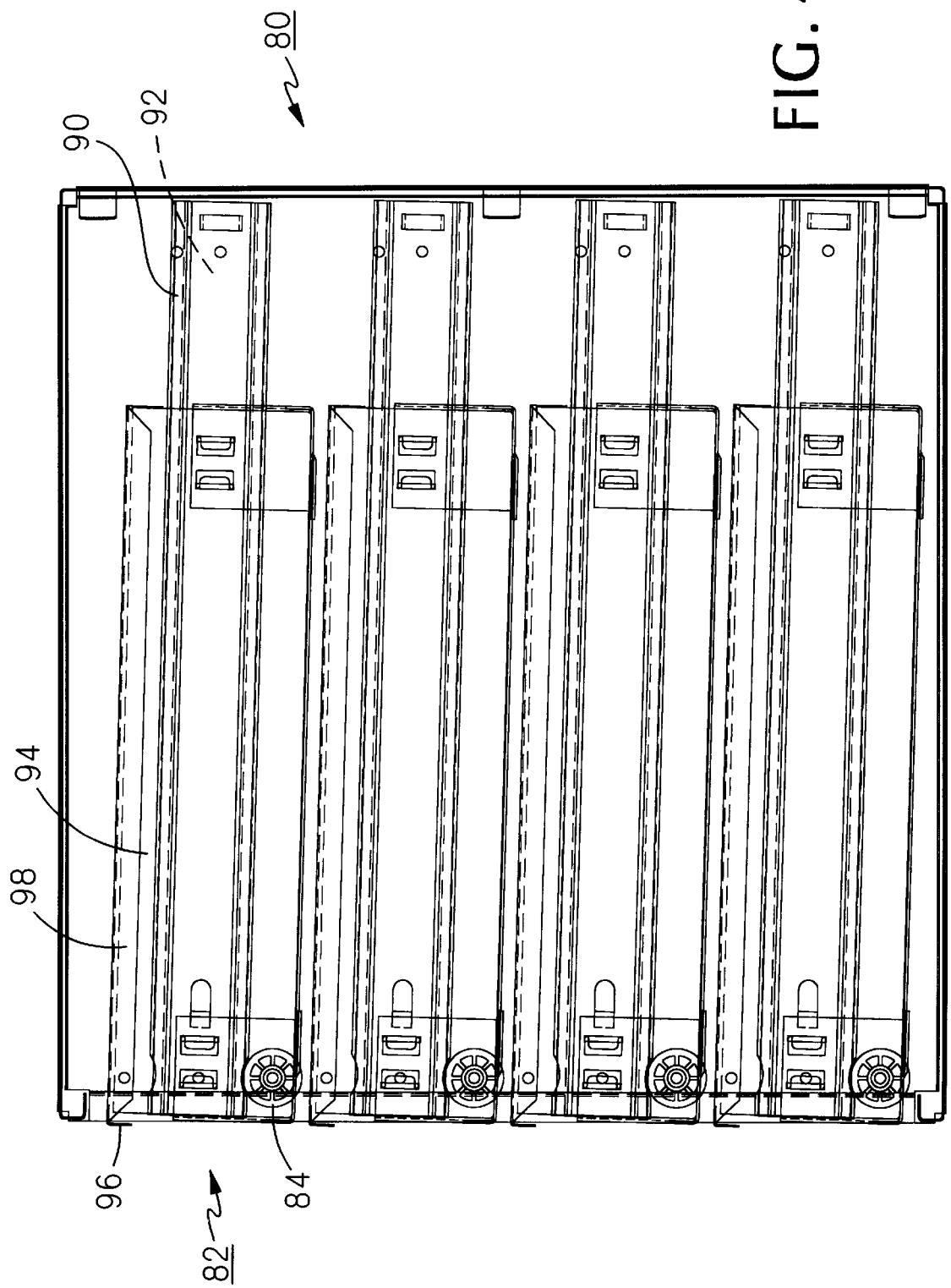

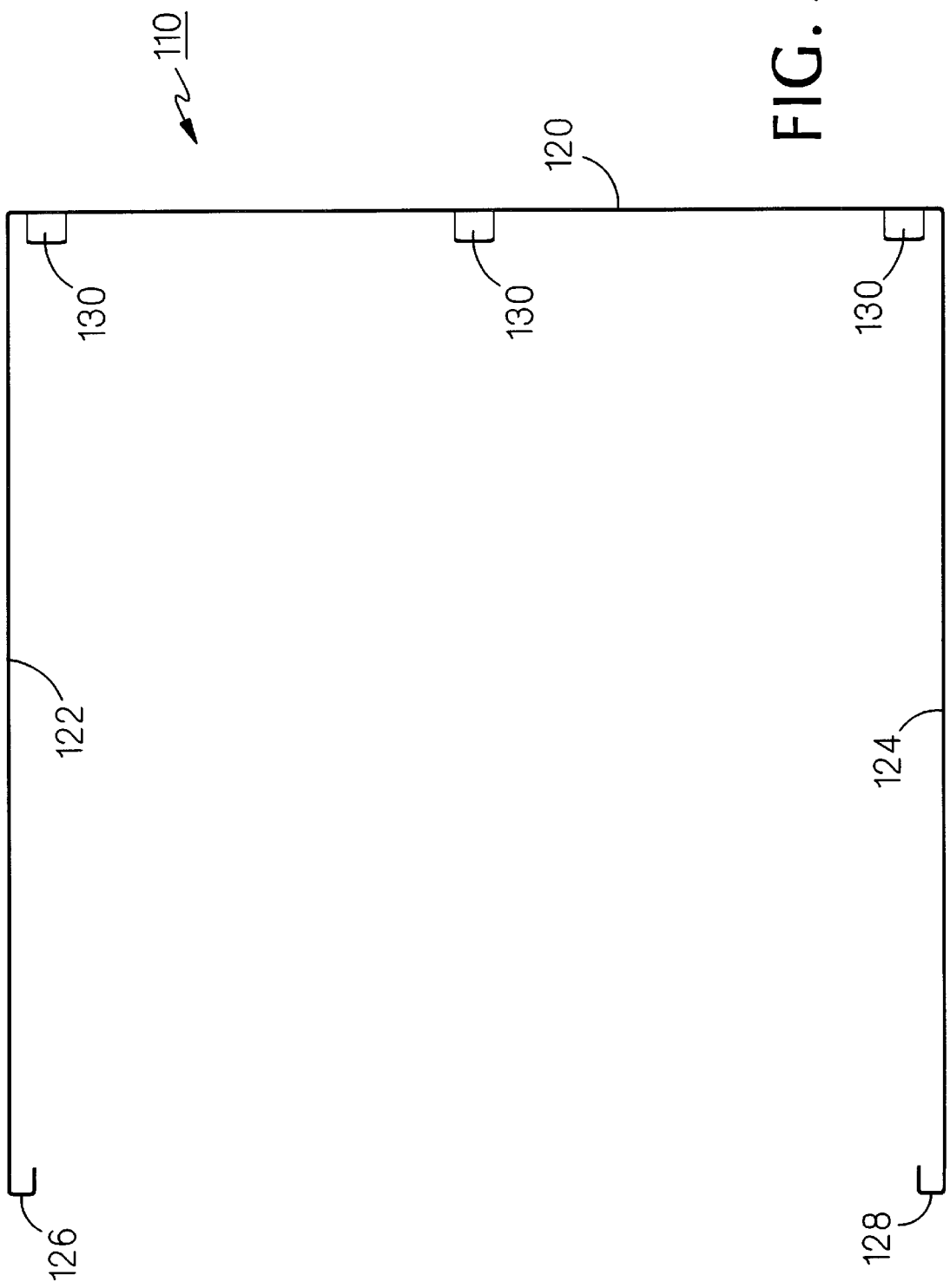

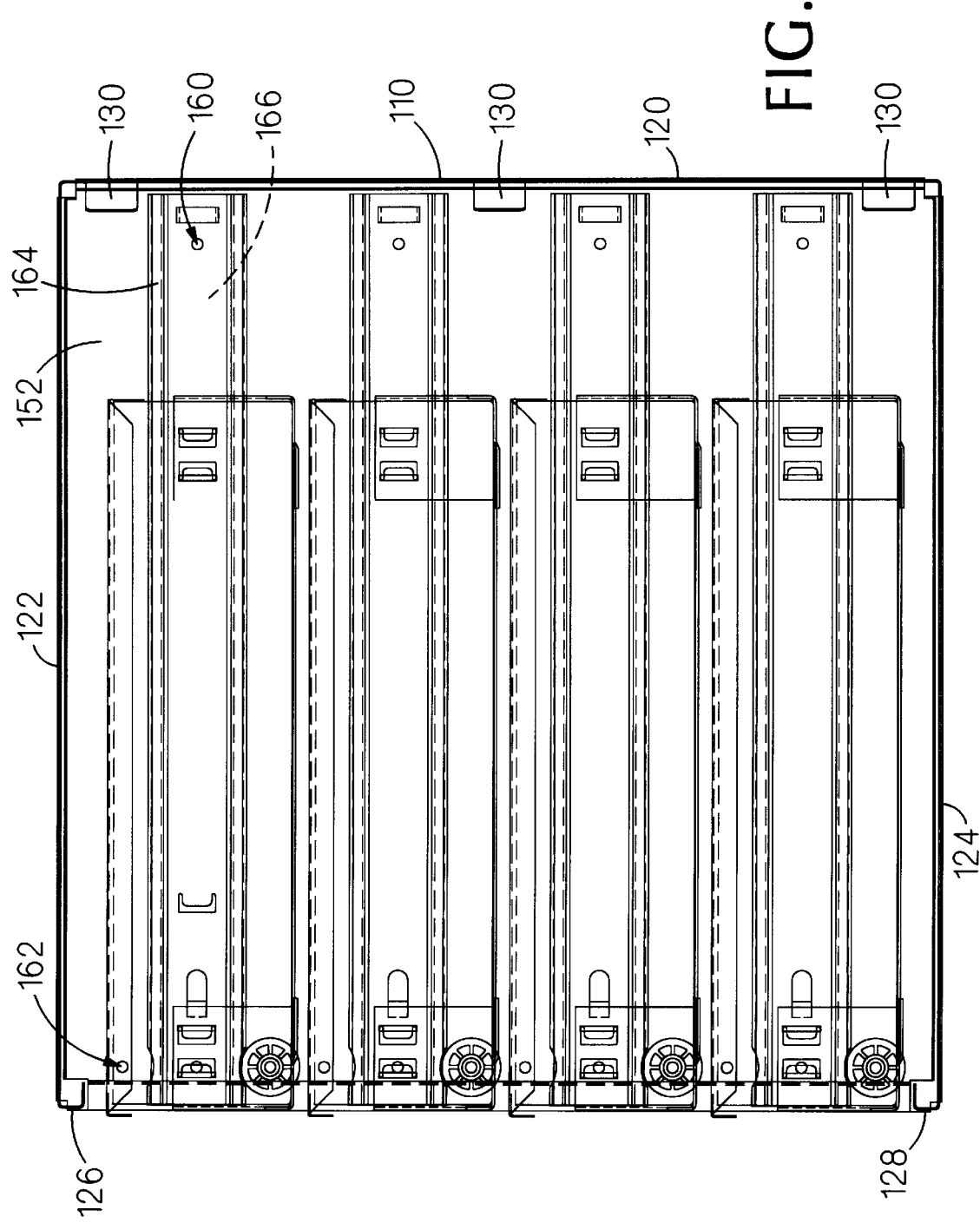

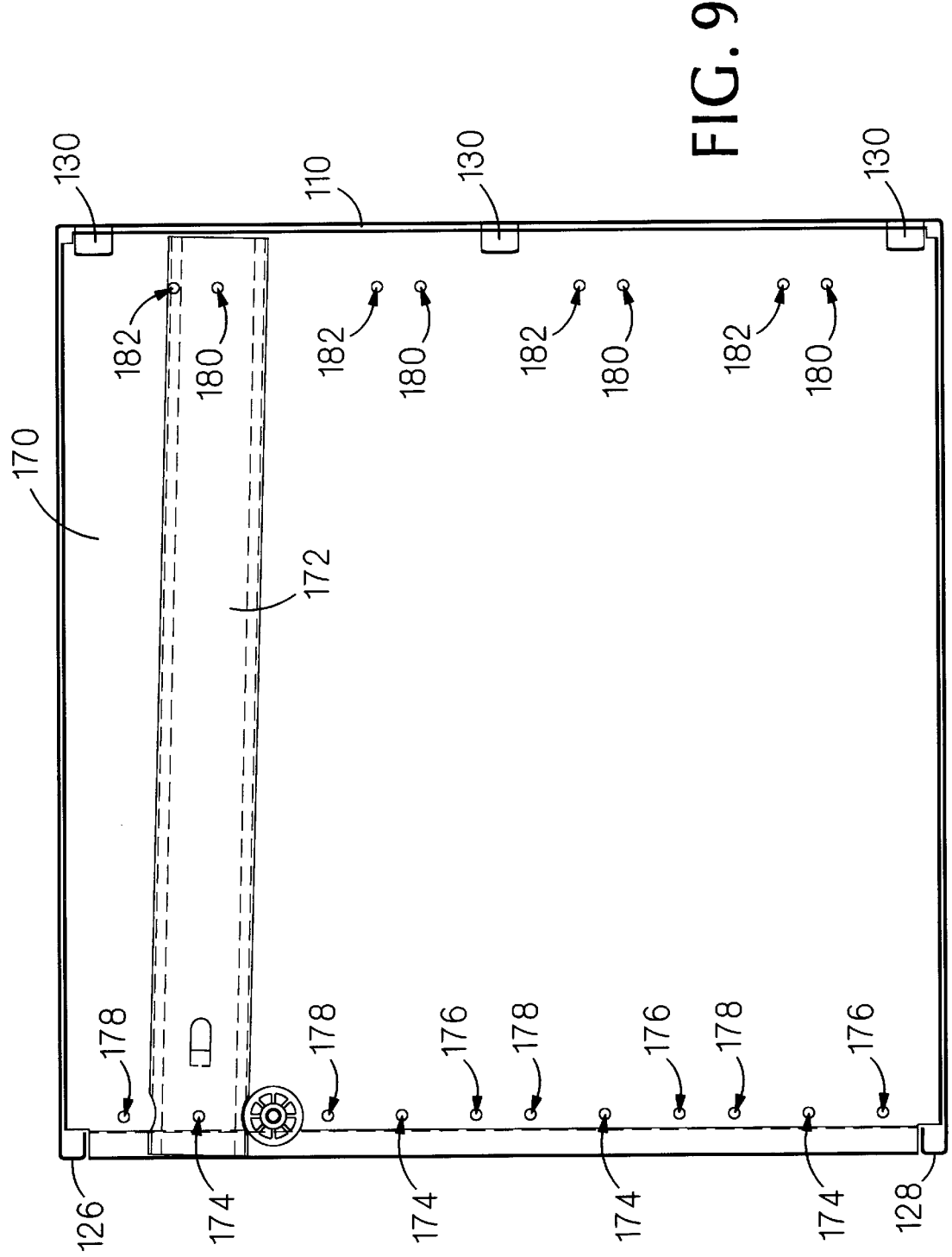

5,927,838

CABINET HAVING SIMPLIFIED PANEL CONSTRUCTION

CROSS-REFERENCE TO RELATED APPLICATION

The present application is a division of co-pending application Ser. No. 08/852,314, filed May 7, 1997, and titled CABINET AND SLIDING DRAWER HAVING SIMPLIFIED FEATURES.

This application is a division of application Ser. No. 08,852,314, filed May 7, 1997, pending.

BACKGROUND OF THE INVENTION

1. Field of the Invention

The present invention relates to cabinets generally and, more particularly, but not by way of limitation, to novel cabinet and sliding drawer with improved roller construction, improved manufacturability, and a drawer that remains essentially horizontal when fully extended from the cabinet.

2. Background Art

Cabinets with one or more drawers are universally used for the storage and ready accessibility of a wide variety of materials, small parts and business papers being common examples of such materials.

Some such cabinets and drawers are constructed with telescoping two- or three-piece drawer slides, with one of the slides being attached to the drawer and another of the slides being attached to the inside of the cabinet, such a drawer slide assembly being employed on either side of the drawer. In may cases, the slides have one or more wheels, or rollers, disposed between adjacent ones of the slides, the roller(s) being mounted inside the smaller of the slides. This greatly reduces the sliding friction between the slides, but the diameter of the roller is necessarily limited and, therefore, the reduction in sliding friction is limited to the capabilities of a roller having a given diameter. The width of the slides in which the rollers are mounted is somewhat narrow, leading to instability and the tendency for the roller and its corresponding slide to become disengaged.

Cabinet drawer slides are typically horizontally attached to the drawer and to the inside of the cabinet. This arrangement results in the outer end of the drawer dropping somewhat downwardly when the drawer is fully or nearly fully withdrawn from the cabinet, due to the weight of the drawer and because the slides have a certain amount of "play" therebetween as a result of wear or intentional design clearances, the latter being required so that the slides move freely.

Cabinets are typically constructed of metal, with an outer housing having side, rear, top, and bottom walls formed or permanently attached together, sometimes with front rails or a front wall extending between the side walls, separate members being welded together. Slides are usually spot welded to the inside surfaces of the side walls. If an error or defect in one of the members is discovered during manufacture or at final inspection, the entire work to that point must usually be discarded.

INVENTION TO PROVIDE

An improved cabinet and drawer slide construction that reduces the amount of material that must be discarded due to defects.

It is another object of the invention to provide an improved cabinet in which the foregoing features are economically manufactured.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in one preferred embodiment, a cabinet comprising: a generally hollow, rectilinear housing having opposite sides and top, back, and bottom walls; said side panels having rearwardly facing U-shaped channels formed along front edges thereof; inner side panels attachable to said side panels by insertion of front edges thereof into said U-shaped channels and rotating said inner panels about said U-shaped channels to parallel proximity with inner surfaces of said side panels and being removably secured in such position.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 1 is a fragmentary, side elevational view, partially cutaway, of one embodiment of a cabinet with sliding drawer, constructed according to the present invention.

FIG. 3 is a fragmentary, side elevational view, partially cutaway, of another embodiment of a cabinet and sliding drawer, constructed according to the present invention.

FIG. 4 is a cutaway, side elevational view of a cabinet with sliding drawers showing another aspect of the present invention.

FIG. 5 is a side elevational view, in cross-section, of an external wrap for a cabinet, constructed according to one aspect of the present invention.

FIG. 8 is a cutaway side elevational view of the completed cabinet.

FIG. 9 is a side elevational, cross-sectional view of a partially completed cabinet.

DETAILED DESCRIPTION OF THE PREFERRED EMBODIMENTS

Figure 2:
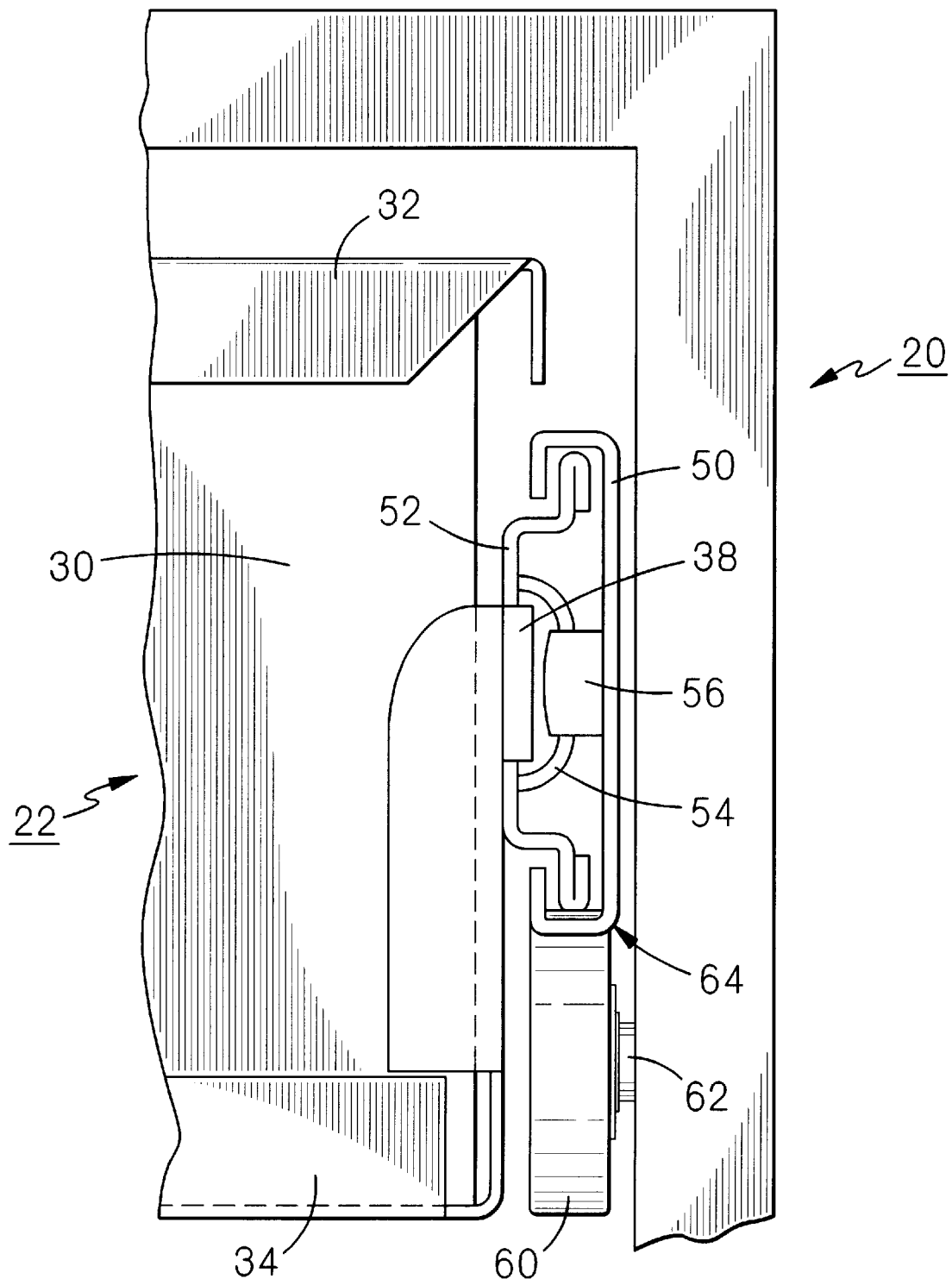
FIG. 2 is a fragmentary, front elevational view of the embodiment of FIG. 1.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates one embodiment of a cabinet and sliding drawer constructed according to the present invention, the cabinet being generally indicated by the reference numeral 20 and the drawer being generally indicated by the reference numeral 22. As shown, drawer 22 includes a compartment parts box 30 mounted covered with a hinged lid 32 for access to the interior of the box. Box 30 is attached to front and rear cradle members 34 and 36, respectively, by means of tabs, as at 38, the front and rear cradles being connected by a centrally disposed crossmember 40 extending therebetween and attached thereto. Cabinet 20 and drawer 22 are arranged so that box 30 may be fully withdrawn from the cabinet. It will be understood that the above is only one of a number of conventional cabinet/drawer arrangements with which the present invention may be employed.

Attached to the inner surface of cabinet 20 is a horizontal outer slide member 50 and attached to the one side of drawer 22 is an inner slide member 52. As with conventional drawer slides, inner slide 52 telescopingly engages the interior of outer slide 50. Accidental complete withdrawal of drawer 22 from cabinet 20 is prevented by the engagement of a loop 54 formed on inner slide 52 engaging a stop 56 attached to outer slide 50.

In the case of the present invention, there is no roller disposed between outer and inner slides 50 and 52. Rather, the present invention provides a roller 60 engaging inner slide 52, but having its axis disposed externally to outer slide 50. Roller 60 has its axle 62 attached to the inner surface of cabinet 20 and contacts the lower edge of inner slide 52 through an opening 64 defined through the lower edge of outer slide 50. FIG. 2 more clearly illustrates aspects of this arrangement. A ball bearing (not shown) may be disposed between roller 60 and axle 62.

FIG. 3 illustrates the elements of FIGS. 1 and 2 with the addition of a second roller 70, having its axle 72 disposed externally to outer slide 50, and contacting the upper edge of inner slide 52 through an opening 74 defined through the outer slide. Such an arrangement is particularly useful when the drawer is to contain heavy materials and, especially, when it is to be fully withdrawn as is shown on FIGS. 1 and 3. When used with two or more drawers, roller 70 can be offset rearwardly from roller 60 (as shown) to nest behind the equivalent of roller 60 (not shown) contacting an inner slide (not shown) above roller 70, in space not otherwise used.

The use of external rollers 60 (FIGS. 1 and 2) or rollers 60 and 70 (FIG. 3) offers several advantages over conventionally constructed cabinet/drawer arrangements. One of these is that wider rollers may be employed. In the typical construction, tabs 38 protrude into inner slide 52, limiting the width of a roller disposed within the inner slide. Use of external rollers 60 or 60 and 70 permits use of rollers of much larger diameters than internally disposed rollers. This permits a significantly higher O.D./I.D. ratio with inherently reduced friction. With the use of an external roller 60 or rollers 60 and 70, the rollers can be made wider, thus providing more stability while decreasing the I.D. requirement for a given load and enhancing the above ratio and reducing friction.

FIG. 4 illustrates a cabinet with sliding drawers, generally indicated by the reference numeral 80, and constructed according to another aspect of the present invention.

Cabinet 80 is shown as having a plurality of drawers, as at 82, which are similar to drawer 22 (FIGS. 1–3), although it will be understood that this aspect of the invention is not so limited and the invention may be used, as well, with other types of drawers and any number of drawers, including a single drawer. Cabinet 80 is also shown as employing external rollers, as at 84, although it will be understood that the invention may be used, as well, in cabinets using no rollers or cabinets with conventional rollers disposed internally of slides.

Cabinet 80 includes a plurality of outer and inner slides 90 and 92, respectively, having the same form and function of outer and inner slides 20 and 22 (FIGS. 1–3). Again, the present invention is not limited to the types of slides shown. As can be observed from FIG. 4, slides 90 and 92 are canted such that they slope downwardly inwardly from the front of cabinet 80. The angle of cant is chosen such that, when drawer 82 is withdrawn fully or nearly fully from cabinet 80, the drawer will be essentially horizontal, the angle of cant compensating for any wear or intentional design clearances.

In the present case, the fronts of boxes 94 remain orthogonal to the major axes of the boxes, the lips 96 of the lids 98 of the boxes offsetting the canted fronts appearancewise. With drawers having greater height and/or with a cabinet with a front panel, it may be desirable to mount the fronts of the drawers at an angle so they lie in the same plane as the front of the cabinet.

FIGS. 5–9 illustrate an aspect of the present invention whereby construction of a cabinet with sliding drawers is easily performed, while minimizing the amount of defective materials that must be discarded.

FIG. 5 illustrates an external wrap for a cabinet constructed according to the present invention, the wrap being generally indicated by the reference numeral 110. Wrap 110 includes a back panel 120 which will become the back panel of the cabinet and top and bottom panels 122 and 124 which will become, respectively, the top and bottom panels of the cabinet. The front edges of top and bottom panels 122 and 124 have rearwardly open U-shaped channels 126 and 128, respectively, formed therealong. It should be noted that wrap 110 is symmetrical about its central axis such that bottom panel 124 can serve as the top panel of the cabinet. This feature is advantageous when, for example, panel 122 is found to contain a visual defect that would preclude its use as a top panel for the cabinet. Wrap 110 can then be inverted 180 degrees, thus avoiding discarding the wrap. FIG. 5 also shows inwardly bent tabs 130 formed in back panel.

Figure 6:
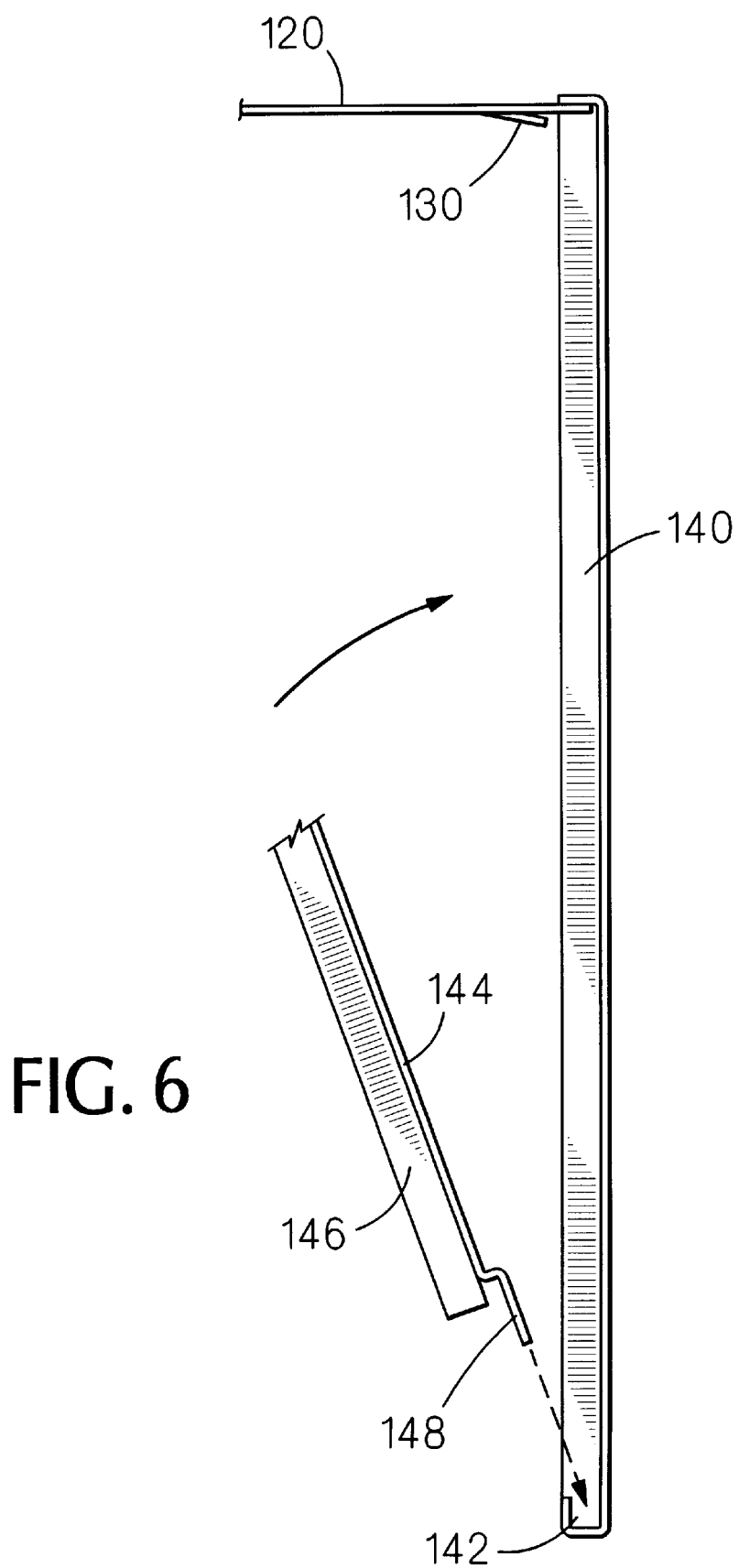
FIG. 6 is a fragmentary, top plan view showing a step in the manufacture of the cabinet.

FIG. 6 illustrates back panel 120 with a right side panel 140 spot welded to the right edge of the back panel. It will be understood that there is a left side panel (not shown on FIG. 6), which is a mirror image of right side panel 140, and which is similarly attached to the left edge of the back panel. Right side panel 140 includes a rearwardly facing U-shaped channel 142 formed along the front edge thereof.

An inner panel 144 has an outer slide 146 attached thereto and has a sidewardly offset lip 148 formed along the front edge of the panel. To attach inner panel 144 to right side panel 140, lip 148 is inserted in channel 142, as indicated by the broken arrow on FIG. 6. Then, inner panel 144 is rotated about lip 148, as indicated by the solid arrow on FIG. 6 and until the rear edge (not shown) of the inner panel snaps behind the ends of tabs 130. Inner panel 144 can be easily removed by depressing tabs 130 and swinging the inner panel away from right side panel 140.

Figure 7:
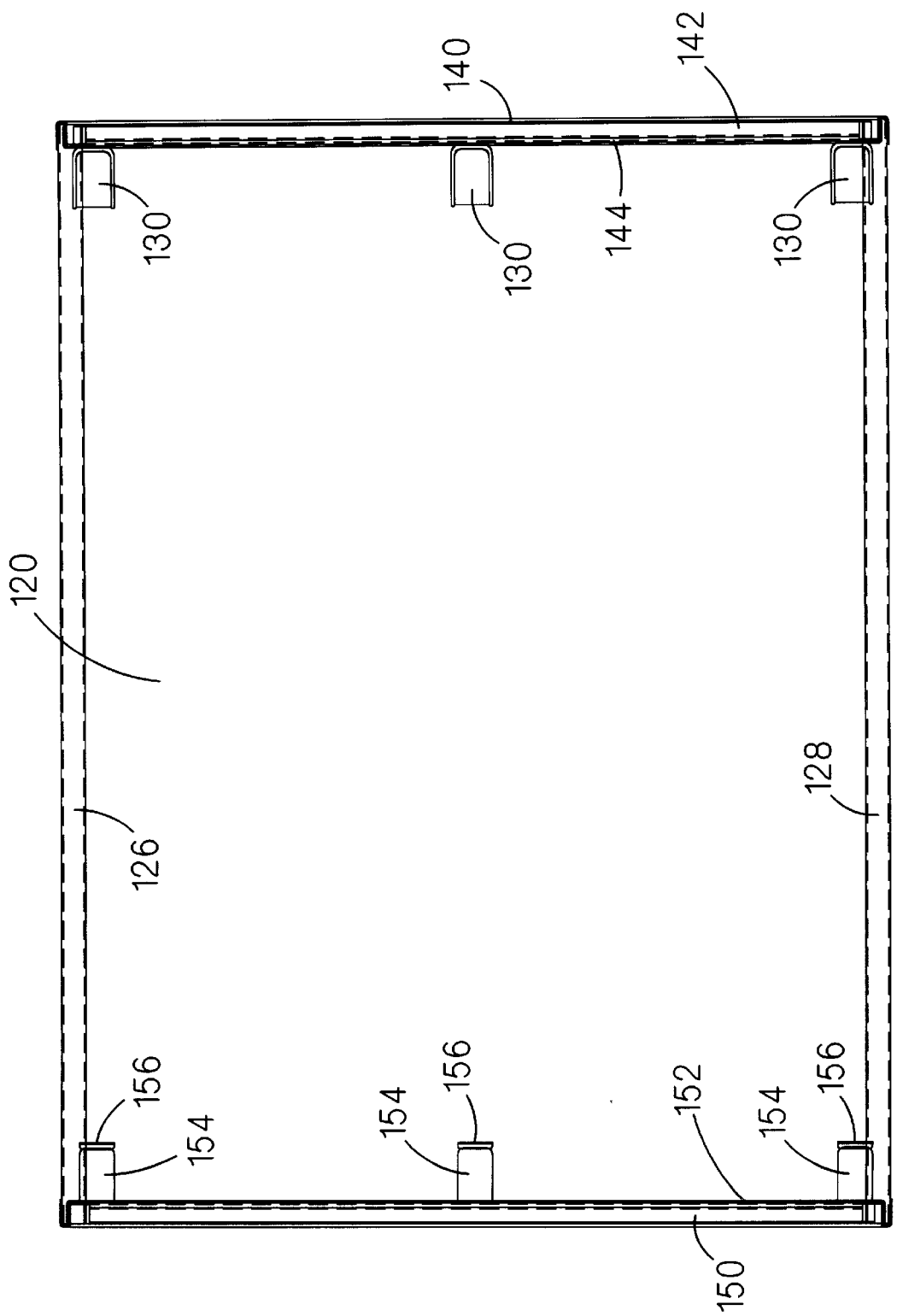
FIG. 7 is a front elevational view showing a partially completed cabinet.

FIG. 7 illustrates wrap 110 with right side panel 140 attached thereto and inner panel 144 attached to the right side panel. Also shown is a left side panel 150 attached to wrap 110 in the same manner as right side panel 140 and an inner panel 152 attached to the left side panel. The front edge of inner panel 152 is attached to left side panel 150 in the same manner as inner panel 144 is attached to right side panel 140; however, the rear of inner panel 152 is removably attached to wrap 110 by means of tabs 154 formed on inner panel 152 snapping behind tabs 156 formed on the wrap. It will be understood that to maintain wrap 100 in a symmetrical shape, only one type of attachment means will be used on both sides of the wrap. No slides are shown; however, the usual method of construction is to attach slides to inner panels before attachment of inner panels to cabinet sides.

FIG. 8 illustrates that inner panels 144 and 152 are symmetrical and identical. It will be understood that, although drawers and rollers are shown which are identical to those described above, this aspect of the invention is applicable to cabinets with any type of drawers and with or without rollers. Registration holes, as at 160 are defined through the front and rear ends of the slides and through inner panel 152 to properly align the slides on the panel with a suitable fixture (not shown). When inner panel 152 is used as inner panel 144 (FIG. 6 and 7), the same registration holes 160 will be used for the same purpose; however, when rollers are used, a second set of holes, at 162, are provided in the panel for the axles of the rollers so that the panel can be used on either side of the cabinet. Outer and inner slides 164 and 166 are also symmetrical about their major axes, so that they may be used on either right or left inner side panels.

FIG. 9 illustrates that symmetry can be provided even when inner panels are to be used with canted slides (FIG. 4). Here, a left side inner panel 170 has attached thereto a canted outer slide 172. Inner panel 170 is provided with registration holes 174 defined therethrough for locating the front ends of outer slides 172 regardless of whether the inner panel is used on the left or the right side of a cabinet. If rollers are to be used, axle holes 176 are provided for use when panel 170 is used on the left side of a cabinet and axle holes 178 are provided for use when the panel is used on the right side of a cabinet. In a similar manner, registration holes are provided for the rear end of outer slides 172 so that panel 170 can be used on either the left or the right side of a cabinet, with registration holes 180 for left side use and registration holes 182 for right side use.

In conventional cabinet construction, final painting is done after assembly. This means that sliding surfaces are painted also; however, this increases friction between the surfaces. The present invention permits the slides and inner panels to be "finished" with zinc primer which provides greatly improved sliding friction.

The snap-in feature of the inner panels provides for more economical manufacturing and permits the inner panels to be easily removed for repair or replacement. Virtually all components are "mirrored" designs, such that right and left side components are the same parts used twice and the wrap can be used right side up or upside down. Repairs at the manufacturing, distributor, or consumer level can be made via panel or shell replacement, as required. Conventional cabinets cannot be repaired or, at least, not easily repaired in most cases, resulting in discarded completed or partially completed cabinets. The decision whether to use or not to use rollers in a particular cabinet can be made near the final step in manufacture or even easily changed in the event of a mistake, making overall production control a more efficient task.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A cabinet, comprising:
   (a) a generally hollow, rectilinear housing having opposite sides and top, back, and bottom walls;
   (b) said side panels having rearwardly facing U-shaped channels formed along front edges thereof; and
   (c) inner side panels attachable to said side panels by insertion of front edges thereof into said U-shaped channels and rotating said inner panels about said U-shaped channels to parallel proximity with inner surfaces of said side panels and being removably secured in such position by means of snap tabs formed in said back wall and engaging said inner panels.

2. A cabinet, as defined in claim 1, wherein: said top, back, and bottom walls are formed as a one-piece, symmetrical wrap.

3. A cabinet, as defined in claim 1, wherein: said side panels are identical in shape and dimensions.

4. A cabinet, as defined in claim 1, wherein: said inner panels are identical in shape and dimensions.

5. A cabinet, as defined in claim 1, wherein: said inner panels have attached thereto two opposing drawer slide mechanisms, said drawer slide mechanisms being symmetrical about major axes thereof and being identical in shape and dimensions.

6. A cabinet, comprising:
   (a) a generally hollow, rectilinear housing having opposite sides and top, back, and bottom walls;
   (b) said side panels having rearwardly facing U-shaped channels formed along front edges thereof; and
   (c) inner side panels attachable to said side panels by insertion of front edges thereof into said U-shaped channels and rotating said inner panels about said U-shaped channels to parallel proximity with inner surfaces of said side panels and being removably secured in such position by means of snap tabs formed on said inner panels engaging tabs formed on said back wall.

7. A cabinet, as defined in claim 6, wherein: said top, back, and bottom walls are formed as a one-piece, symmetrical wrap.

8. A cabinet, as defined in claim 6, wherein: said side panels are identical in shape and dimensions.

9. A cabinet, as defined in claim 6, wherein: said inner panels are identical in shape and dimensions.

10. A cabinet, as defined in claim 6, wherein: said inner panels have attached thereto two opposing drawer slide mechanisms, said drawer slide mechanisms being symmetrical about major axes thereof and being identical in shape and dimensions.

* * * * *